United States Patent
Eliav et al.

(10) Patent No.: US 12,184,693 B1
(45) Date of Patent: Dec. 31, 2024

(54) SYSTEM, METHOD, AND COMPUTER PROGRAM FOR AN UNATTENDED TRAP FOR A NETWORK BRUTE FORCE ATTACK

(71) Applicant: Amdocs Development Limited, Limassol (CY)

(72) Inventors: Nagina Eliav, Even Yehuda (IL); Vladimir Tkach, Kefar Yona (IL); Sergey Podalov, Herzliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 127 days.

(21) Appl. No.: 17/223,949

(22) Filed: Apr. 6, 2021

(51) Int. Cl.
*H04L 29/06* (2006.01)
*H04L 9/40* (2022.01)

(52) U.S. Cl.
CPC ...... *H04L 63/1491* (2013.01); *H04L 63/1408* (2013.01); *H04L 63/20* (2013.01); *H04L 63/083* (2013.01)

(58) Field of Classification Search
CPC . H04L 63/1491; H04L 63/1408; H04L 63/20; H04L 63/083
See application file for complete search history.

(56) References Cited

U.S. PATENT DOCUMENTS

| | | | |
|---|---|---|---|
| 10,476,891 B2 | 11/2019 | Vissamsetty et al. | |
| 10,560,434 B2 | 2/2020 | Bingham et al. | |
| 10,574,697 B1* | 2/2020 | McClintock | H04L 63/1491 |
| 10,992,708 B1* | 4/2021 | Sellers | H04L 63/1416 |
| 11,777,988 B1* | 10/2023 | Lin | H04L 63/1425 726/22 |
| 2018/0063191 A1* | 3/2018 | Woronka | G06F 9/45558 |
| 2018/0167412 A1* | 6/2018 | Barrett | H04L 63/1491 |
| 2018/0262529 A1* | 9/2018 | Allen | G06F 21/566 |
| 2020/0053123 A1 | 2/2020 | Pliskin et al. | |
| 2020/0137096 A1 | 4/2020 | Endler | |

FOREIGN PATENT DOCUMENTS

KR 20200035614 A 4/2020

OTHER PUBLICATIONS

Wikipedia, "Honeypot," Wikipedia, 2021, 8 pages, retrieved from <https://en.wikipedia.org/wiki/Honeypot_(computing)>.
Wikipedia, "Brute-force attack," Wikipedia, 2021, 7 pages, retrieved from <https://en.wikipedia.org/wiki/Brute-force_attack>.
Stack Exchange, "Where can I find good dictionaries for dictionary attacks?" Stack Exchange, Information Security, 2021, 9 pages, retrieved from https://security.stackexchange.com/questions/1376/where-can-i-find-good-dictionaries-for-dictionary-attacks.
Anonymous, "Brute-force Dictionary Attacks Definition and Prevention," RAPID7DOTCOM, 2021, 8 pages, retrieved from https://www.rapid7.com/fundamentals/brute-force-and-dictionary-attacks/.

* cited by examiner

*Primary Examiner* — Wasika Nipa
(74) *Attorney, Agent, or Firm* — Zilka-Kotab, P.C.

(57) ABSTRACT

As described herein, a system, method, and computer program are provided for an unattended trap for a brute force attack. A brute force attack on private data in a computer network is detected. Secret information expected by the brute force attack is generated. At least one honeypot having the secret information is created in the computer network. A state of the at least one honeypot is updated based on simulated activity.

19 Claims, 4 Drawing Sheets

SYSTEM, METHOD, AND COMPUTER PROGRAM FOR AN UNATTENDED TRAP FOR A NETWORK BRUTE FORCE ATTACK

FIELD OF THE INVENTION

The present invention relates to techniques for detecting brute force attacks in computer networks.

BACKGROUND

A brute force attack is a technique used by hackers/intruders to electronically access the protected data of another entity, such as data protected by secret information including passwords, encryption keys, etc. It involves repeated trial-and-error guesses of the secret information, and is considered brute force because the attempts are excessive and forceful in order to try and force access to the protected data.

Due to the repetitive attempts involved in a brute force attack, brute force attacks consume significant resources of the network being attacked. Moreover, this network resource consumption will continue until the brute force attack is stopped, which is typically only done by a trigger developed by the intruder (e.g. when the secret information has been correctly guessed). For example, while the process managed by the intruder and can be blocked, for example by blocking the source internet protocol (IP) address used by the intruder, the intruder can simply change the source IP address and continue the attack from another IP.

There is thus a need for addressing these and/or other issues associated with the prior art.

SUMMARY

As described herein, a system, method, and computer program are provided for an unattended trap for a brute force attack. A brute force attack on private data in a computer network is detected. Secret information expected by the brute force attack is generated. At least one honeypot having the secret information is created in the computer network. A state of the at least one honeypot is updated based on simulated activity.

DETAILED DESCRIPTION

Figure 1:
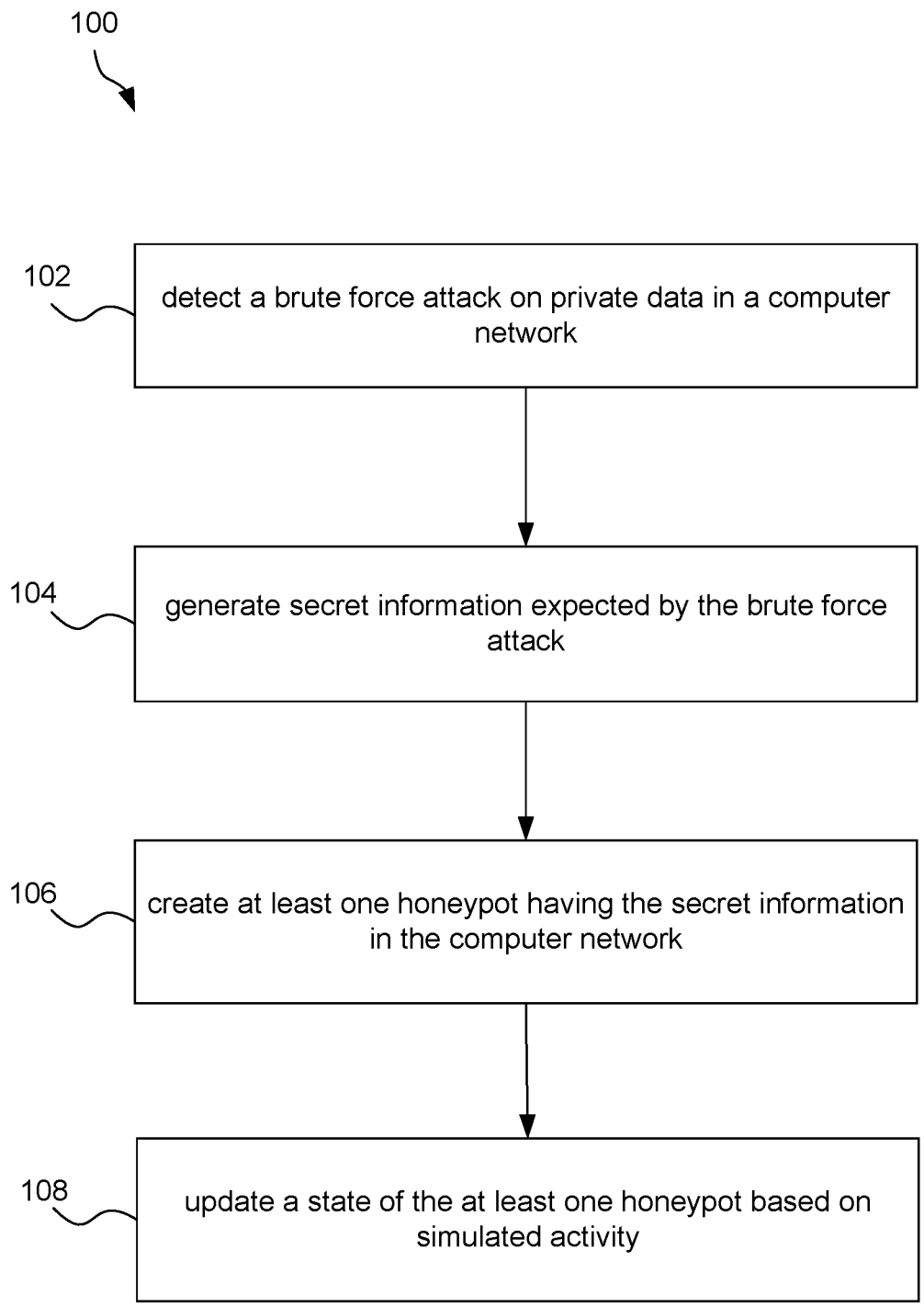
FIG. 1 illustrates a method to provide an unattended trap for a brute force attack, in accordance with one embodiment.

FIG. 1 illustrates a method 100 to provide an unattended trap for a brute force attack, in accordance with one embodiment. The method 100 may be performed by any computer system described below with respect to FIGS. 3 and/or 4. For example, the method 100 may be performed by a local computer system on which the brute force attack is occurring, or a computer system remotely located from the local computer system (i.e. a computer system in the cloud), or a combination thereof.

In operation 102, a brute force attack on private data in a computer network is detected. The brute-force attack refers to a hacker, intruder, attacker, etc. repeatedly submitting guesses for secret information to gain access to the private data. The secret information may be a username/password combination, an encryption key, or any other type of secret information used to secure access to the private data. The private data may be any data that is secured by the secret information, such as private user data or private business data.

The brute force attack may be identified in any desired manner, such as by using a predefined policy or by using a custom policy. The predefined/custom policy may indicate a known pattern of a brute force attack, such that the brute force attack may be detected in the computer network when the known pattern is detected in the computer network.

In operation 104, secret information expected by the brute force attack is generated. As noted above, the secret information may refer to the information attempted by the brute force attack to be correctly guessed in order to access the private data. The secret information that is generated may be different from (e.g. may simulate) the secret information that protects the private data.

In one embodiment, the secret information may be generated based on a predicted type of the secret information. For example, the predicted type of the secret information may be determined from information gathered by monitoring the brute force attack, such as the type of input being provided by the brute force attack for each guess of the secret information. In one exemplary embodiment, the predicted type of the secret information may be a username and password combination. In this case, the secret information that is generated may include a username and a password.

In operation 106, at least one honeypot having the secret information is created in the computer network. A honeypot refers to a resource in the computer network that simulates the location of the private data attempted to be accessed by the brute force attack. For example, the honeypot may be a virtual machine, in one embodiment. It should be noted that the at least one honey pot may refer to a single honeypot or a group of connected honeypots.

As noted above, the honeypot(s) is created to have the secret information generated in operation 104. Additionally, the honeypot(s) may be created to have simulated private data. The simulated private data may refer to private data that is different from (e.g. simulates) the private data attempted to be accessed by the brute force attack.

In operation 108, a state of the at least one honeypot is updated based on simulated activity. The state may refer to the simulated activity performed on the honeypot(s), such as a login process, an authentication process, creating and/or deleting files, etc. The state may refer to a timestamp indicating a last simulated activity performed (simulated) on the honeypot(s). The state may refer to (simulated) data located (e.g. stored) on the honeypot(s) via the simulated activity.

In one embodiment, the simulated activity may be generated based on a profile associated with the private data. The profile may indicate a type of storage on which the private data is located (e.g. workstation, system files, or a database), a role of a user corresponding to the private data (e.g. technical writer, accounting, DBA, manager, etc.), or any other profile information capable of being used to simulate the activity. In another embodiment, the simulated activity may be generated using artificial intelligence, such as a machine learning algorithm.

In one optional embodiment, creating the honeypot(s) in the computer network may also include adding the honeypot(s) to a trap handler service that manages the honeypot(s) in the computer network. The trap handler service may then simulate the activity, such as for use in updating the state of the honeypot(s).

As an option, the state of the honeypot(s) may be updated periodically. By updating the state of the honeypot(s), the honeypot(s) may appear to the source of the brute force attack to be a legitimate location of the private data. In this way, the source of the brute force attack may be redirected, forwarded, etc. to the honeypot(s), and the resource consumption of the brute force attack may be limited to the resources dedicated to the honeypot(s). In turn, this may avoid consumption of the resources dedicated to the actual location of the private data by the brute force attack.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
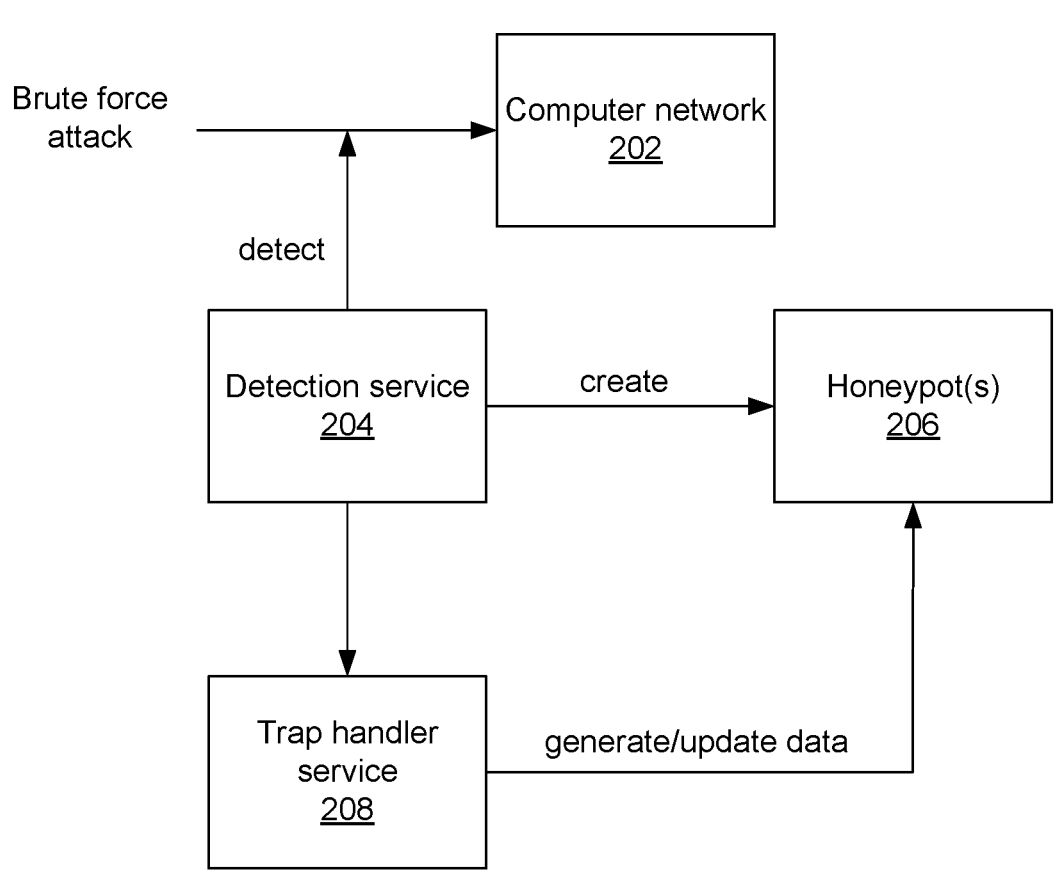
FIG. 2 illustrates a flow diagram for a system that provides an unattended trap for a brute force attack, in accordance with one embodiment, in accordance with one embodiment.

FIG. 2 illustrates a flow diagram for a system 200 that provides an unattended trap for a brute force attack, in accordance with one embodiment, in accordance with one embodiment. As an option, the system 200 may be implemented in the context of the details of the previous figure and/or any subsequent figure(s). For example, the system 200 may implement a service that performs the method 100 of FIG. 1. In various embodiments, the service can be cloud-based, on-premise based or a hybrid thereof. Of course, however, the system 200 may be implemented in the context of any desired environment. Further, the aforementioned definitions may equally apply to the description below.

As shown, a brute force attack on a computer network 202 (e.g. a company intranet) is detected by a detection service 204. The detection service 204 can use an existing security infrastructure or can use a custom solution (of the particular computer network 202) to detect the brute force attack. In one embodiment, the brute force attack is detected by identifying attempts to fetch (guess) authorization credentials in order to access private data stored on the computer network 202.

When it is determined that the behavior pattern associated with these attempts is valid, the detection service 204 does not identify the attempts as a brute force attack and therefore takes no action. However, when it is determined that the behavior pattern associated with these attempts is invalid (i.e. the behavior pattern matches a known behavior pattern for a brute force attack), the detection service 204 creates a new honeypot 206 (or group of connected honeypots) with relevant data according to expected rules and the monitoring of the intruder activity corresponding to the detected brute force attack. The relevant data includes at least credentials expected by the intruder causing the brute force attack. Further, the intruder activity may be monitored to provide complete information to a security team about the specific issue.

The honeypot(s) 206 is then added to a trap handler service (THS) 208. For example, the THS 208 may be notified to being managing the honeypot(s) 206. The THS 208 is responsible for keeping honeypot data in an actual (live) state (e.g. by updating its timestamp, etc.). The THS 208 will generate data for the honeypot(s) 206 using an artificial intelligence (e.g. machine learning) algorithm according to a profile of the targeted device (e.g. workstation, system files, database, etc.) in the computer network 202.

The THS 208 will also update data on the honeypot(s) 206 the using artificial intelligence algorithm for simulating real user activity according to a user profile (e.g. technical writer, accounting, DBA, manager, etc.). The user activity that may be simulated may include authentication (e.g. logging in to the target device), creating files, deleting files, etc.). In this way, the brute force attack will be directed to the honeypot(s) 206 which will appear legitimate to the intruder, and in turn the brute force attack will be directed away from the target device of the computer network 202.

Figure 3:
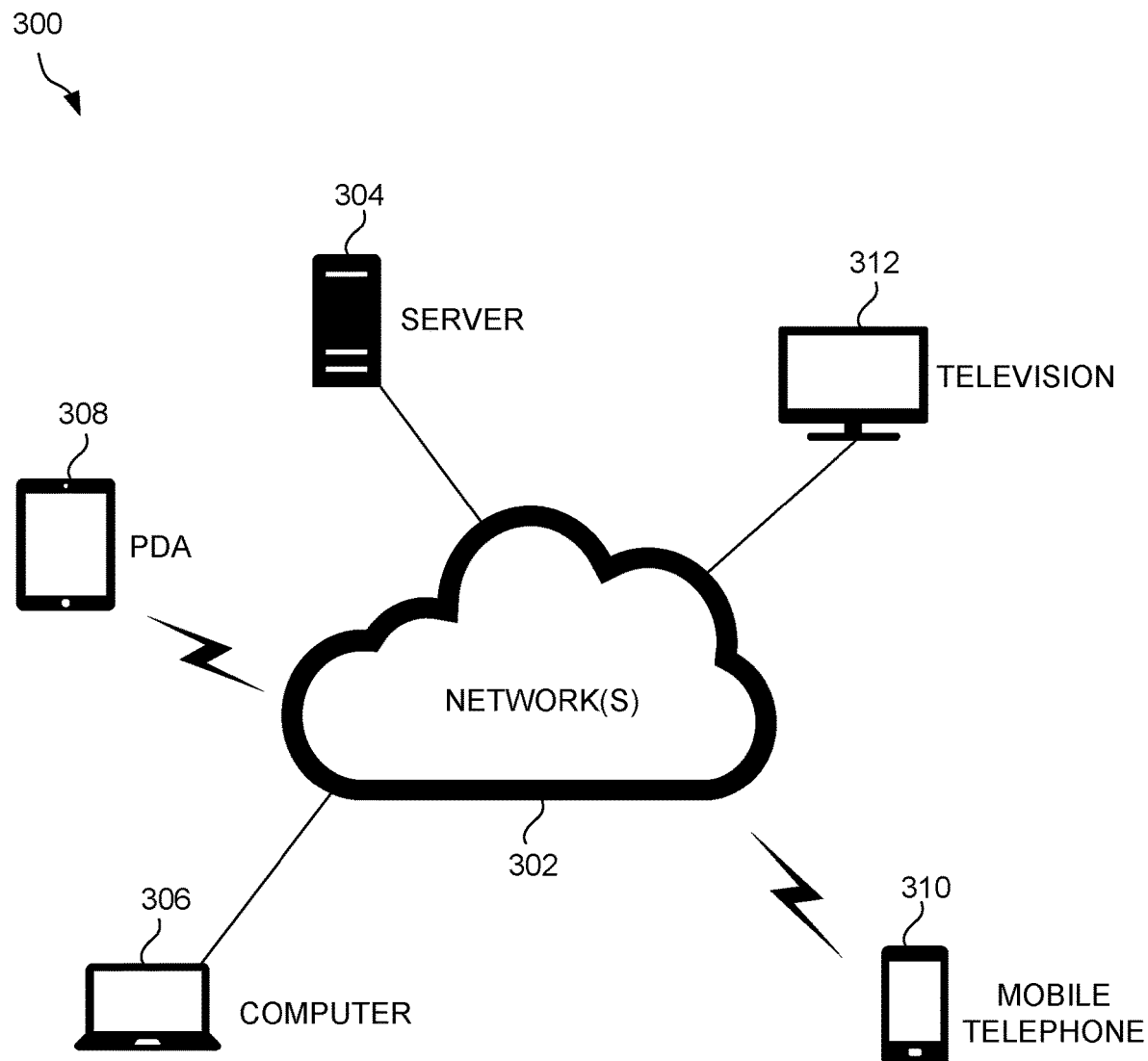
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
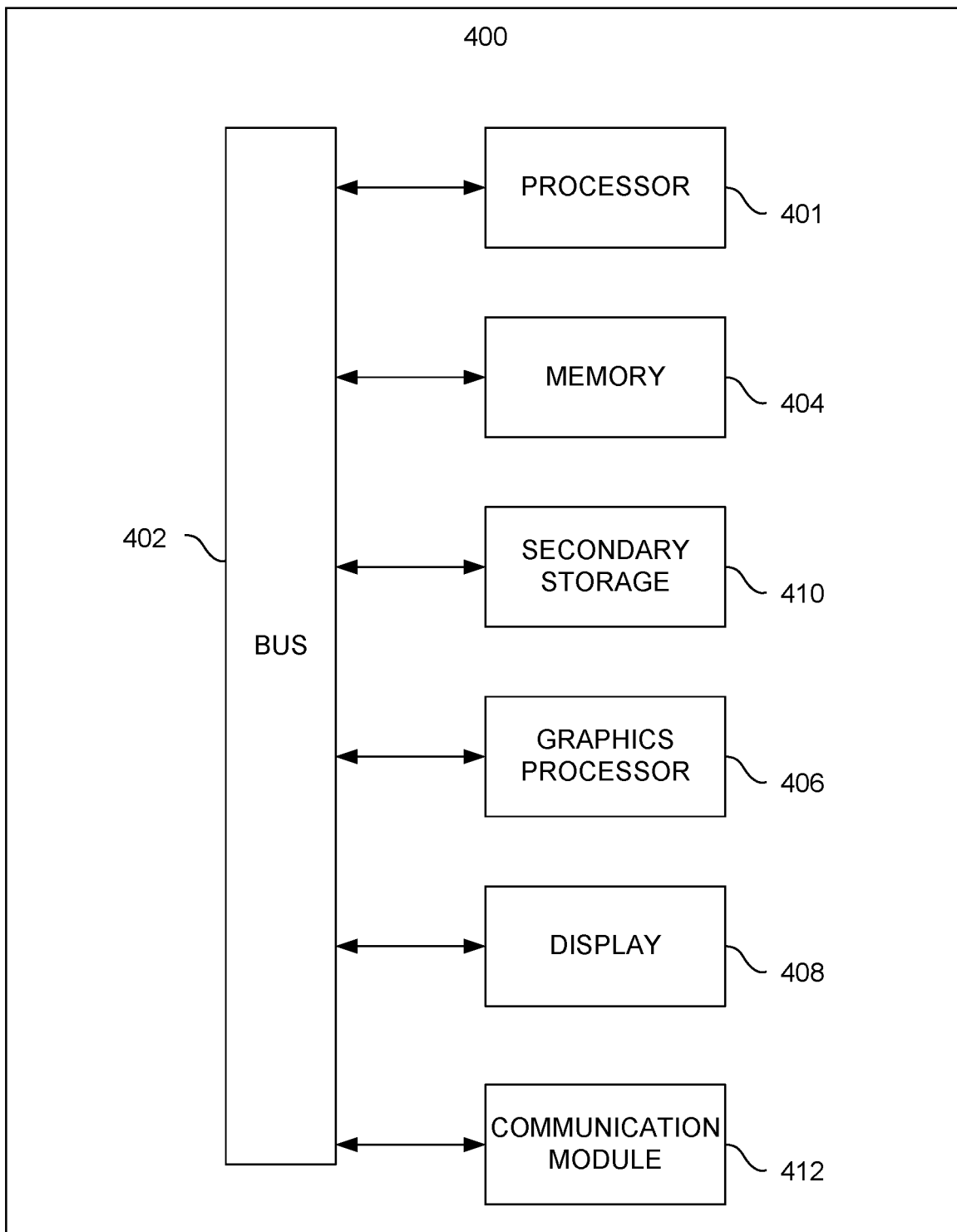
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the one or more processors to cause the device to:

detect a brute force attack on private data in a computer network;
   generate secret information expected by the brute force attack, wherein the secret information is generated based on a predicted type of the secret information, and wherein the predicted type of the secret information is determined from information gathered by monitoring the brute force attack;

create at least one honeypot having the secret information in the computer network, including adding the at least one honeypot to a trap handler service that manages the at least one honeypot in the computer network;

determine a profile of a user corresponding to the private data;

after creating the at least one honeypot, simulate one or more activities of the user on the at least one honeypot according to the profile of the user, the one or more activities including at least one of:

a login process, an authentication process, creation of a file, or deletion of a file; and update a timestamp of the at least one honeypot to indicate a time that a last activity of the one or more activities was simulated on the at least one honeypot.

2. The non-transitory computer-readable media of claim 1, wherein the brute force attack is detected using a pre-defined policy.

3. The non-transitory computer-readable media of claim 1, wherein the predicted type of the secret information includes a username and password combination.

4. The non-transitory computer-readable media of claim 3, wherein the secret information includes a username and a password.

5. The non-transitory computer-readable media of claim 1, wherein the at least one honeypot is a single honeypot.

6. The non-transitory computer-readable media of claim 1, wherein the at least one honeypot is a group of connected honeypots.

7. The non-transitory computer-readable media of claim 1, wherein the trap handler service simulates the user activity.

8. The non-transitory computer-readable media of claim 7, wherein the trap handler service updates the timestamp of the at least one honeypot.

9. The non-transitory computer-readable media of claim 1, wherein the profile of the user is a role of the user.

10. The non-transitory computer-readable media of claim 9, wherein the type of storage includes one of a workstation, system files, or a database.

11. The non-transitory computer-readable media of claim 1, wherein the user activity is generated using a machine learning algorithm.

12. The non-transitory computer-readable media of claim 1, wherein the timestamp of the at least one honeypot is updated periodically to make the at least one honeypot appear to a source of the brute force attack as a legitimate location of the private data.

13. A method, comprising:

at a computer system:

detecting a brute force attack on private data in a computer network;

generating secret information expected by the brute force attack, wherein the secret information is generated based on a predicted type of the secret information, and wherein the predicted type of the secret information is determined from information gathered by monitoring the brute force attack;

creating at least one honeypot having the secret information in the computer network, including adding the at least one honeypot to a trap handler service that manages the at least one honeypot in the computer network;

determining a profile of a user corresponding to the private data;

after creating the at least one honeypot, simulating one or more activities of the user on the at least one honeypot according to the profile of the user, the one or more activities including at least one of:

a login process, an authentication process, creation of a file, or deletion of a file; and updating a timestamp of the at least one honeypot to indicate a time that a last activity of the one or more activities was simulated on the at least one honeypot.

14. A system, comprising:

a non-transitory memory storing instructions; and one or more processors in communication with the non-transitory memory that execute the instructions to:

detect a brute force attack on private data in a computer network;

generate secret information expected by the brute force attack, wherein the secret information is generated based on a predicted type of the secret information, and wherein the predicted type of the secret information is determined from information gathered by monitoring the brute force attack;

create at least one honeypot having the secret information in the computer network, including adding the at least one honeypot to a trap handler service that manages the at least one honeypot in the computer network;

determine a profile of a user corresponding to the private data;

after creating the at least one honeypot, simulate one or more activities of the user on the at least one honeypot according to the profile of the user, the one or more activities including at least one of:

a login process, an authentication process, creation of a file, or deletion of a file; and update a timestamp of the at least one honeypot to indicate a time that a last activity of the one or more activities was simulated on the at least one honeypot.

15. The non-transitory computer-readable media of claim 1, wherein after the at least one honeypot is created, a plurality of activities of the user are simulated on the at least one honeypot according to the profile of the user, wherein the plurality of activities are simulated at different points in time, and wherein the timestamp of the at least one honeypot is updated for each activity of the plurality of activities.

16. The non-transitory computer-readable media of claim 15, wherein plurality of activities include the login process.

17. The non-transitory computer-readable media of claim 15, wherein plurality of activities include the authentication process.

18. The non-transitory computer-readable media of claim 15, wherein plurality of activities include the creation of the file.

19. The non-transitory computer-readable media of claim 15, wherein plurality of activities include the deletion of the file.

* * * * *